United States Patent [19]

Dunn et al.

[11] Patent Number: 4,791,298
[45] Date of Patent: Dec. 13, 1988

[54] INFRARED DETECTORS

[75] Inventors: William A. E. Dunn, Romsey; David J. Gowlett, Southampton, both of England

[73] Assignee: U.S. Philips Corp., New York, N.Y.

[21] Appl. No.: 14,511

[22] Filed: Feb. 13, 1987

[30] Foreign Application Priority Data

Feb. 14, 1986 [GB] United Kingdom ............... 8603680

[51] Int. Cl.⁴ ............................................. F25B 19/00
[52] U.S. Cl. ............................ 250/352; 250/370.01; 62/514 JT
[58] Field of Search ............... 250/352, 370.15, 370 L; 62/514 R, 514 JT

[56] References Cited

U.S. PATENT DOCUMENTS

| | | | |
|---|---|---|---|
| 3,926,011 | 12/1975 | Sollami | 62/514 JT |
| 4,041,314 | 8/1977 | Oppelt | 250/352 |
| 4,178,775 | 12/1979 | Smetana | 250/352 |
| 4,262,200 | 4/1981 | Guy | 250/352 |
| 4,474,036 | 10/1984 | Ball et al. | 250/352 |
| 4,647,778 | 3/1987 | Kline et al. | 250/352 |

FOREIGN PATENT DOCUMENTS

| | | |
|---|---|---|
| 1061130 | 3/1967 | United Kingdom . |
| 1195373 | 10/1967 | United Kingdom . |
| 1559474 | 1/1980 | United Kingdom . |
| 1568958 | 6/1980 | United Kingdom . |
| 2147739 | 5/1985 | United Kingdom . |

Primary Examiner—Janice A. Howell
Assistant Examiner—William F. Rauchholz
Attorney, Agent, or Firm—William L. Botjer

[57] ABSTRACT

An infrared detector has an infrared detector element (2) mounted at a first part (11) of a housing (1), a Joule-Thomson cooling element (3) accommodated in a second part (12), and an infrared transmissive window (15) at the front of the housing (1). A compact, space-saving and light weight structure with improved optical efficiency is obtained. The core of the Joule-Thomson cooling element (3) forms a third part (13) of the housing (1), and these second and third parts (12 and 13) of the housing extend towards the front of the detector. The cooler core (13) which may carry a cooled filter (25) has a hollow shape or is otherwise infrared transmissive in front of the detector element (2) and can direct incident radiation (50) towards the detector element (2). For this purpose the inner surface of the hollow core (13) may carry a reflective conductor pattern (18,19) which also provides electrical connections for the detector element (2). This core part (13) may seal a channel in a grooved intermediate member (48 in FIG. 3) between the second and third housing parts (12 and 13) so as to form the Joule-Thomson cooling element (3) without requiring conventional finned metal tubing (31 in FIG. 1).

22 Claims, 2 Drawing Sheets

INFRARED DETECTORS

BACKGROUND OF THE INVENTION

This invention relates to infrared detectors comprising a housing and a Joule-Thomson cooling element, particularly but not exclusively detectors having fast cool-down characteristics as well as a compact size and light weight and suitable for detecting infrared radiation having a wavelength in the 3 to 5 or 8 to 14 μm (micrometer) wavebands.

Published United Kingdom Patent Application (GB-A) No. 2147739 describes an infrared detector comprising a housing. At least one infrared detector element is mounted at a first part of the housing. A Joule-Thomson cooling element formed around a core is accommodated in a second part of the housing to effect cooling of the detector element during operation of the detector by expansion of coolant into a space adjacent the first part of the housing. Infrared transmissive means at a front of the housing permit transmission of infrared radiation to the detector element. The second part accommodating the cooling element is of low thermal conductivity and capacity and is, in this device, situated behind the first part where the detector element and infrared transmissive window are mounted. Such an arrangement is conventional practice. However, the design of the housing is such that the detector element can be cooled down very rapidly, for example within a few seconds, and the detector is used in situations where the cooled operating state need not be maintained for a very long time, for example at most 5 minutes.

SUMMARY OF THE INVENTION

According to the present invention there is provided an infrared detector comprising a housing, at least one infrared detector element mounted at a first part of the housing, a Joule-Thomson cooling element formed around a core and accommodated in a second part of the housing, which cooling element serves to effect cooling of the detector element during operation of the detector by expansion of coolant into a space adjacent the first part of the housing, and infrared transmissive means at a front of the housing to permit transmission of infrared radiation to the detector element, characterised in that the core of the Joule-Thomson cooling element forms a third part of the housing, that the second and third parts of the housing extend from the first part of the housing towards the front of the housing, and that the third part of the housing is infrared transmissive in front of the detector element to permit transmission of the infrared radiation through the core of the Joule-Thomson cooling element, from the front of the housing to the infrared detector element.

The invention is based on a recognition by the present inventors that the arrangement of the Joule-Thomson cooling element around a hollow or otherwise infrared transmissive core forming a third part of the housing extending from the detector element towards the front of the detector housing permits the obtainment of a compact housing structure which as well as saving space and reducing weight, can provide several important advantages for fast cool-down and for the optical efficiency of the detector. Thus, the core forming the third part of the housing may be hollow and form part of an enclosure with the first part and with the infrared transmissive means, may serve to direct incident infrared radiation towards the detector element, may carry electrical connections for the detector element, may carry electrical connections for the detector element (for example as part of the reflective pattern for directing the radiation), and may carry a lens and/or window and/or filter which may also be cooled during operation by the Joule-Thomson cooling element accommodated between the second and third parts of the housing.

It should be noted that, as described in United Kingdom patent specification (GB-A) No. 1 061 130, it is known to use a light-pipe to direct infrared radiation onto a detector element for the 20 to 200 μm waveband and for the light-pipe to carry a cooled filter in front of the detector element. The detector element surrounded by a superconducting magnetic coil is cooled to a liquid-helium temperature by being mounted in the bottom of a tapered tube inserted in a cryostat containing liquid helium which is itself inserted in a cryostat containing liquid nitrogen. Because it is not practical to provide infrared windows in the walls of this double cryostat construction, the radiation is incident along the tapered tube which is designed to act as a light pipe. The construction is very bulky, heavy and very slow to cool down to its operating temperature. It is not practical to use a Joule-Thomson cooler for cooling the detector element. The detector is not easily mobile, and if turned on its side or upside down a loss of the cryogenic liquid results. The field of use of this detector is quite different from that of detectors in accordance with the present invention.

BRIEF DESCRIPTION OF THE DRAWING

Various features in accordance with the invention will now be illustrated in particular embodiments of the invention, by way of example, with reference to the accompanying diagrammatic drawings, in which.

Figure 1:
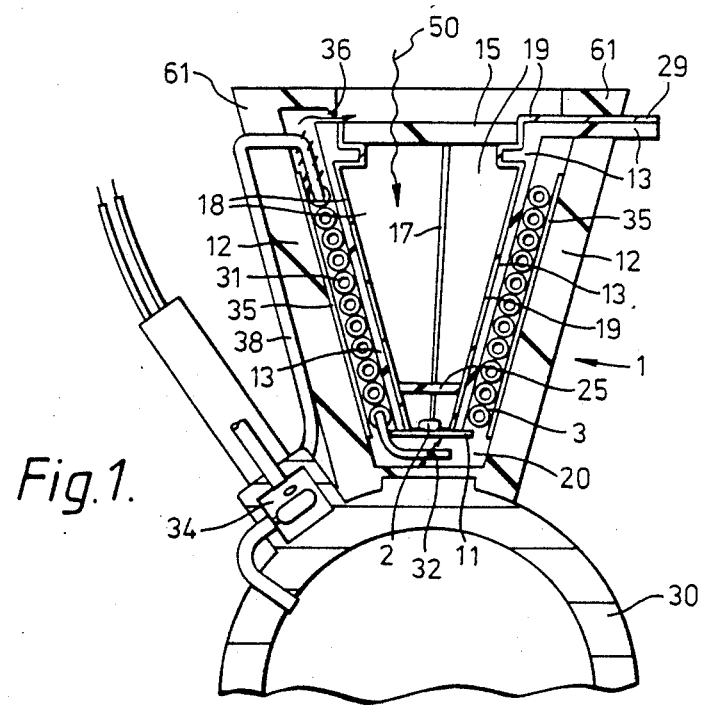
FIG. 1 is a cross-sectional view of part of one infrared detector in accordance with the invention and mounted on a coolant bottle.

The drawings are diagrammatic and not drawn to scale. For the sake of convenience and clarity in the drawings, the dimensions and proportions of various features of these detectors have been shown exaggerated or diminished in size. The same reference signs used in one embodiment are generally used to refer to corresponding or similar parts of the other embodiments.

DETAILED DESCRIPTION OF THE PREFERRED EMBODIMENT

The infrared detector of FIG. 1 comprises a housing 1 within which an infrared detector element 2 and a Joule-Thomson cooling element 3 are accommodated. The infrared radiation 50 to be detected is incident on the detector element 2 via an infrared transmissive window 15, for example of germanium, at the front of the housing 1. This radiation 50 may be in the 3 to 5 or 8 to 14 μm wavelength bands, depending on the nature of the detector element 2. In accordance with the present invention the Joule-Thomson cooling element 3 is formed around a core which forms a third part 13 of the housing 1 and is accommodated between second and third parts 12 and 13 respectively of the housing 1 which extend towards the window 15 of the housing 1 from a first part 11 where the detector element 2 is mounted. The third part 13 of the housing 1 has a hollow shape in front of the detector element 2 to permit transmission of the infrared radiation 50 therethrough from the front window 15 to the detector element 2. The second part 12 in which the Joule-Thomson cooling element 2 is accommodated is located concentrically around the hollow third part 13.

In the detector of FIG. 1, at the wavelength or wavelengths of the radiation 50 detected by the detector element 2, at least a major portion 18 and 19 of the whole inner surface of the hollow third part 13 is highly reflective so acting as a light-pipe directing the incident radiation 50 towards the detector element 2. For this purpose it is advantageous for the reflective hollow in the third part 13 to have a width which increases from the first part 11 towards the front (15) of the housing 1. Thus, both the hollow third part 13 and the facing surface of the second part 12 of the housing 1 may have a generally conical shape as illustrated in FIG. 1.

The Joule-Thomson cooling element 3 may be of any know form appropriate to the detector design. In the form illustrated in FIG. 1, the core forming the hollow third part 13 of the housing 1 is of a frusto-conical shape on which there is wound a helical coil of metal tubing 31 of the Joule-Thomson cooler. A bottle 30 of pressurized fluid (for example argon or dry air) is connected to one end of the coiled tubing 31 via an electrically-initiated gas-flow valve 34 (commonly termed a pyrotechnic gas motor). At the opposite end of the coiled tubing 31, an orifice 32 is present from which the pressurized fluid expands into a space 20 adjacent the first housing part 11 where the detector element 2 is mounted. This expansion of the coolant fluid from the orifice 32 effects a rapid cooling of the fluid (and hence a cooling of the detector element 2) in accordance with the Joule-Thomson effect.

After expansion into the space 20, the cooled fluid flows back over the outside of the tubing 31 between the housing parts 12 and 13 so pre-cooling the pressurized fluid in the tubing upstream of the orifice 32. This regenerative cooling effect rapidly reduces the temperature of the coolant fluid so that, for example, a coolant such as argon or air is liquidfied in the coiled tubing 31 prior to its expansion from the orifice 32. To increase heat transfer between the tubing 31 and the venting coolant, the outer surface of the tubing 31 normally includes metal fins. A laminate foil 35 of superinsulation material (for example polyimide and oxidized aluminium) may be present between the outer housing part 12 and the finned metal tubing 31 to increase the efficiency of the regenerative cooling.

In this way the detector element 2 is rapidly cooled to its operating temperature, for example below 100° K. or at least below 120° K. The detector can be designed to have a cool-down time of less than 1 second and a maximum operational duration of, for example, 1 to 5 minutes.

In the front of the housing, vent holes 36 are preferably provided adjacent the infrared window 15 for venting at least some of the expanded coolant over the front of the window 15 to prevent misting of the window by condensation. The holes 36 may be formed in a retention plate 61 bonded to the front of the housing part 12 and forming part of a clipping arrangement clamping the cooler 2 and housing part 13 in the housing 1.

As illustrated in FIG. 1, the third part 13 of the housing 1 not only provides the core for the coiled metal tubing 31 of the cooling element 3 but also forms an enclosure with the first housing part 11 and the front window 15. The detector element 2 of FIG. 1 is mounted within this enclosure. This multi-functional role of the housing part 13 results in a compact space-saving arrangement which can significantly reduce the distance between the front (15) of the detector housing 1 and the bottle 30 and can also reduce the weight of the detector. Thus the detector housing 1 may be mounted directly on the bottle 30 as illustrated in FIG. 1. Furthermore the thermal capacity needing to be cooled by the cooling element 2 can be reduced for achieving very rapid cool-down times. The FIG. 1 housing for both the detector element 2 and the cooling element 3 simply consists of an outer part 12 and an inner part 11 and 13 with a front window 15.

Both the outer and inner parts 12, 11 and 13 may be formed of moulded plastics material, although the part 12 preferably has a jacket of expanded polyurethane or other good thermally insulating material around it. The part 11 on which the detector element 2 is mounted is preferably formed as a circuit substrate carrying connections for the detector element 2.

The detector element 2 may be mounted on the substrate 11 in known manner, for example by using techniques similar to those described in United Kingdom patent (GB-A) No. 1 559 474. Thus the detector element 2 which may be of passivated cadmium mercury telluride having gold electrodes may be secured to the substrate 11 by a layer of insulating epoxy adhesive. Gold layer interconnections deposited over the edges of the detector element 2 may connect these electrodes to the conductors on the circuit substrate 11. This circuit substrate 11 may be secured by adhesive to an end of the hollow, inner plastics part 13. At least part of the reflective portions 18 and 19 of the inner surface of the hollow part 13 may be fored by an electrically conductive layer pattern (for example, of gold) on this surface which provides separate electrical connections for the detector element 2. These reflective portions 18 and 19 are insulated from each other by gaps 17 in the conductive layer pattern. The conductors on the circuit substrate 11 may be connected by solder or conductive epoxy to the conductive reflective portions 18 and 19 on the hollow housing part 13. External connections 28 and 29 on the outside of the housing part 12 may be formed as a printed lead extension of the conductive reflective portions 18 and 19 on protrusions of the housing part 13, only one of which is illustrated in FIG. 1.

The hollow housing part 13 providing the core for the cooling element 3 may also be used to carry a cold filter 25. Such a filter may be used to selectively transmit infrared wavelengths to the detector element 2, for example wavelengths in the range $10.6+0.3$ $\mu$m (micrometers). The filter 25 is mounted within the hollow housing part 13 (for example by epoxy) and is thermally coupled thereby to this part 13 to permit cooling of the filter 25 by the cooling element 3 during operation of the detector. As illustrated in FIG. 1, the window 15 is mounted on the hollow part 13 in front of the filter 25. The expanded coolant may be vented over the filter 25 by providing a vent hole or even omitting the window 15. The filter 25 may even be omitted to vent the exhaused coolant over the front face of the detector element 2.

In FIG. 1 the helical coil of finned tubing 31 is connected to the bottle valve 34 by a length of unfinned tubing 38 on the outside of the outer housing part 12.

However this tubing 38 may be accommodated in a channel in the housing part 12 and possibly even in the space between the housing parts 12 and 13.

Figure 2:
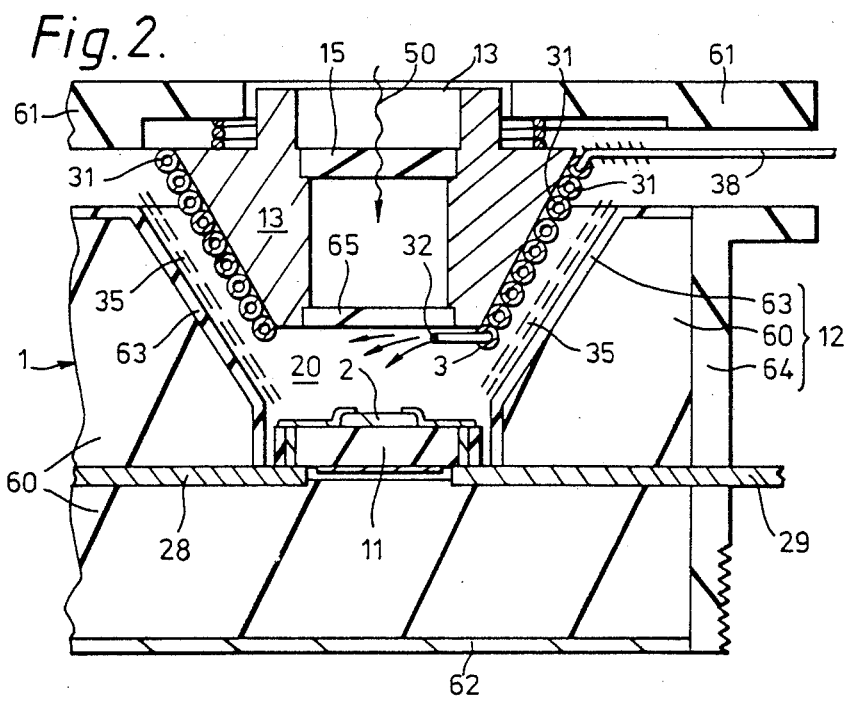
FIGS. 2 and 3 are cross-sectional view of parts of other infrared detectors in accordance with the invention.

Many modifications are possible. In the detector of FIG. 1 the detector element 2 may be mounted on the opposite side of the substrate 11 (i.e. on the cooling-element side) so as to be located in the space 20 into which the coolant expands from the orifice 32. Such an arrangement permits direct cooling of the detector element 2 so that an even faster cool-down is possible. A variation is illustrated in FIG. 2, in which the circuit substrate forming the first housing part 11 on which the detector element 2 is mounted is secured in a recess of the outer second part 12 of the housing 1. The inventors have found that the passivation conventionally provided on detector elements 2 of cadmium mercury telluride (as described in, for example, GB-A No. 1 559 474 and GB-A No. 1 568 958) can provide adequate environmental protection for such a detector element 2 located in the coolant space 20 in detectors having short maximum operating durations (for example at most 3 minutes). However, a transparent, additional protective film of, for example, plastics material may be provided over the detector element 2 and possibly also over its conductors on the substrate 11.

In the detector of FIG. 2, the bulk 60 of the outer second housing part 12 may be of expanded polyurethane contained within walls 62, 63 and 64 of, for example, plastics material. In this case the external connections 28 and 29 may be formed as insulated leads or pins which extend through the side wall 64 and through the bulk 60 to be connected directly to the conductors on the circuit substrate 11 by solder or conductive epoxy. As illustrated in FIG. 2, these conductors may be brought through the substrate so that the connections to the leads 28 and 29 is at the back face of the substrate 11. If desired, most of the back face of the substrate 11 may be coated to render it highly reflective at the wavelength(s) of the radiation 50, and the coated part of this back face may be convex so as to concentrate the reflected radiation onto the detector element 2.

As well as a front infrared window 15, there is an additional infrared window 65 at the inside end face of the hollow third housing part 13 forming the core of the Joule-Thomson cooler 3. The whole inner surface of the cavity in the hollow part 13 may be made highly reflective or highly absorbent as desired for any particular application. The cooler 3 and housing part 13 are firmly secured in the outer housing part 12 by a spring-loaded retention plate 61 which is clamped to a flange at the front of the side-wall 64. These members are shown separated in FIG. 2.

Figure 3:
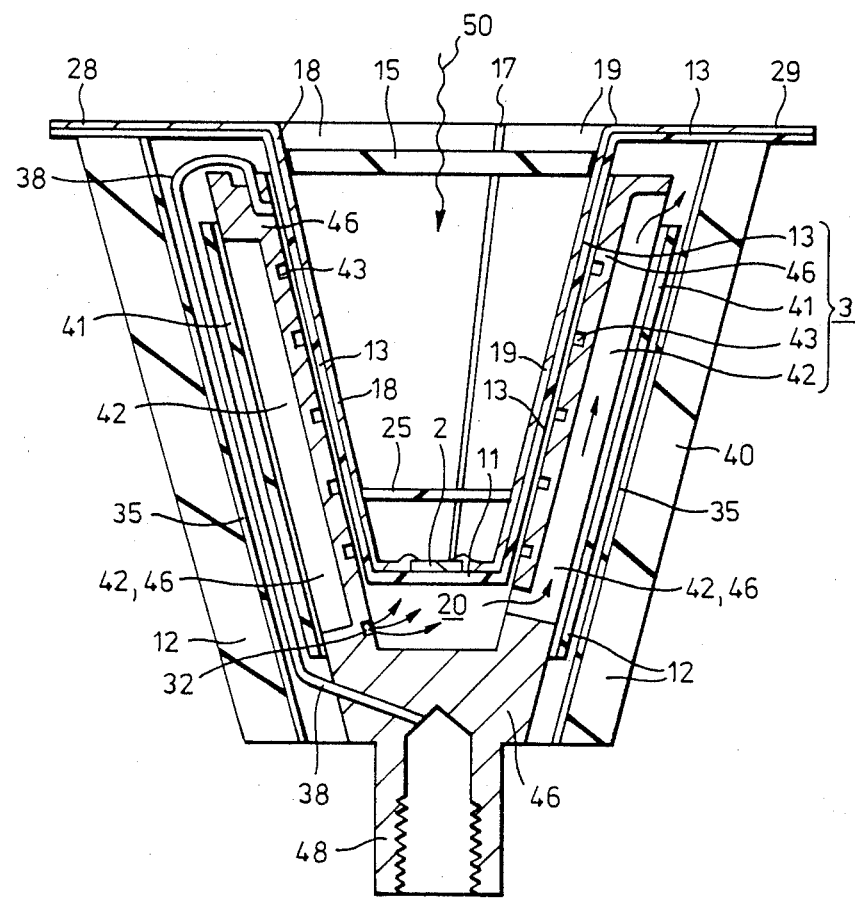

Instead of using finned metal tubing 31, the Joule-Thomson cooler 3 may be formed by providing a grooved intermediate member 46 between the facing surfaces of the second and third parts 12 and 13 of the housing 1. Such an embodiment is illustrated in FIG. 3. The member 46 may be connected to a coolant bottle by tubing 38 and a threaded mount 48, narrow channels 43 corresponding to the bore in the finned tubing 31, a space 20 into which the coolant expands from the orifice 32 at the end of the narrow channels 43, and wide channels 42 for venting the expanded coolant. The wide and narrow channels 42 and 43 are arranged to have good heat exchange therebetween for regenerative cooling. The narrow channels 43 are sealed by the hollow third housing part 13 which is bonded to the member 46. The wide channels are similarly sealed by a conical plate 41 which may form the inside of the outer housing part 12. Thus the walls 13 and 41 form part of the cooler 3. For clarity in the drawing, the various parts are shown separated in FIG. 3.

The bulk of the second housing part 12 may be formed by one or more masses 40 of thermal insulating material (for example expanded polyurethane) providing good thermal insulation between the exterior of the housing and both the detector element 2 and the cooling element 3. A laminate foil 35 of superinsulant material may be present between the plate 41 and the mass 40. This arrangement of a channelled member 46 sealed to the hollow third part 13 of the housing 1 permits very efficient cooling of the part 13. This is partiucларly advantageous for cooling the filter 25 and for reducing the emissivity of the inner surface of the hollow third part 13 if that surface is not very highly reflective or is even absorbent at the wavelength(s) detected by the detector element 2. However it is particularly advantageous for the inner surface of the hollow third part 13 in the detector of FIG. 3 to be highly reflective so as to form a light-pipe for the radiation 50.

Although conical shapes have been illustrated in the drawings, it will be evident that different shapes are possible, for example parabolic or other shapes curving in three dimensions or for example cylindrical. It is particularly convenient to form the infrared transmissive third part 13 of the housing as a hollow member. However for some detector applications it may be acceptable to have a solid member 13 of infrared transmissive material having a low thermal conductance, for example particular plastics material or germanium.

We claim:

1. An infrared detector comprising a housing, at least one infrared detector element mounted at a first part of the housing, a Joule-Thomson cooling element formed around a core and accommodated in a second part of the housing, which cooling element serves to effect cooling of the detector element during operation of the detector by expansion of coolant into a space adjacent the first part of the housing, and infrared transmissive means at a front of the housing to permit transmission of infrared radiation to the detector element, characterized in that the core of the Joule-Thomson cooling element forms a third part of the housing, that the second and third parts of the housing extend from the first part of the housing towards the front of the housing, and that the third part of the housing is infrared transmissive in front of the detector element to permit transmission of the infrared radiation through the core of the Joule-Thomson cooling element, from the front of the housing to the infrared detector element.

2. A detector as claimed in claim 1, further characterized in that the core forming the third part of the housing has a hollow shape, and that, at the infrared wavelength or wavelengths of the radiation detected by the detector element, at least a major portion of the whole inner surface of the hollow third part of the housing is reflective so as to direct incident infrared radiation towards the detector element.

3. A detector as claimed in claim 2, further characterized in that the reflective hollow in the third part has a width which increases from the first part towards the front of the housing.

4. A detector as claimed in claim 3, further characterized in that both the hollow third part of the housing and the second part are generally conical in shape.

5. A detector as claimed in claim 1, further characterized in that the core forming the third part of the housing has a hollow shape forming an enclosure with the first part of the housing and the infrared transmissive means, the detector element being located within said enclosure.

6. A detector as claimed in claim 1, further characterized in that electrical connections for the detector element are carried by the core forming the third part of the housing.

7. A detector as claimed in claim 6, further characterized in that the core forming the third part of the housing has a hollow shape, and that the electrical connections for the detector element comprise an electrically conductive layer pattern at the inner surface of this hollow third part of the housing.

8. A detector as claimed in claim 7, further characterized in that the electrically conductive layer pattern forms at least part of the reflective portion of said inner surface.

9. A detector as claimed in claim 1, further characterized in that the core forming a third part of the housing has a hollow shape, and that a selectively infrared transmissive filter is mounted within and thermally coupled to this hollow third part of the housing to permit cooling of the filter by the Joule-Thomson cooling element during operation of the detector.

10. A detector as claimed in claim 1, further characterized in that an infrared transmissive window of the housing is mounted on the third part at the front of the housing.

11. A detector as claimed in claim 10, further characterized in that vent holes are present in the front of the housing adjacent the infrared transmissive means for venting the coolant over the infrared transmissive means.

12. A detector as claimed in claim 1, further characterized in that between the facing surfaces of the second and third parts of the housing there is provided a grooved intermediate member to form channels of the Joule-Thomson cooling element.

13. A detector as claimed in claim 12, further characterized in that at least the third part of the housing forms a part of the Joule-Thomson cooling element by sealing a channel in the grooved intermediate member.

14. A detector as claimed in claim 1, further characterized in that the second part of the housing comprises one or more masses of thermal insulating material providing thermal insulation between the outside of the housing and both the detector element and cooling element.

15. An infrared detector comprising:
an inner part, said inner part having a forward portion and a rearward portion, said inner part being capable of transmitting infrared radiation;
an infrared detector element disposed proximate said rearward portion of said inner part;
infrared transmissive means disposed proximate said forward portion of said inner part;
an outer part spaced apart from said inner part and surrounding said inner part; and
a Joule-Thomson type cooling element disposed between said inner and outer parts, surrounding said inner part and located between said forward and rearward portions of said inner part, said cooling element being constructed and arranged to cool said infrared detector element.

16. The infrared detector as claimed in claim 15, wherein said inner part is hollow and includes an inner wall having an infrared reflective coating to reflect infrared radiation towards said detector element.

17. The infrared detector as claimed in claim 16, wherein said reflective coating on said inner part is electrically conductive and forms a part of an elelctrical connection to said infrared detector.

18. The infrared detector as claimed in claim 15, wherein said cooling element comprises conduit means for Joule-Thomson effect gas expansion apparatus.

19. The infrared detector as claimed in claim 18, wherein said conduit means include orifice means for venting said gas into said space between said inner and outer parts and proximate to at least one of said infrared detector element and said infared transmissive means.

20. The infrared detector as claimed in claim 15 wherein at least one of said inner and outer parts has diverging walls having a narrower portion disposed proximate said infrared detector element.

21. The infrared detector as claimed in claim 20, wherein at least one of said inner and said outer parts is generally conical in shape.

22. The infrared detector as claimed in claim 15 further including an infrared filter element disposed forwardly from said infrared detector element to filter said radiation impinging on said infrared detector element.

* * * * *